United States Patent
Cianciotto

(10) Patent No.: US 7,265,906 B2
(45) Date of Patent: *Sep. 4, 2007

(54) TRI-TO-HEX LIGHT MIXING AND HOMOGENIZING APPARATUS AND METHOD

(75) Inventor: Frank T. Cianciotto, Tehachapi, CA (US)

(73) Assignee: The Boeing Company, Chicago, IL (US)

( * ) Notice: Subject to any disclaimer, the term of this patent is extended or adjusted under 35 U.S.C. 154(b) by 149 days.

This patent is subject to a terminal disclaimer.

(21) Appl. No.: 11/180,285

(22) Filed: Jul. 12, 2005

(65) Prior Publication Data

US 2007/0014123 A1    Jan. 18, 2007

(51) Int. Cl.
G02B 27/10 (2006.01)
G02B 6/24 (2006.01)
(52) U.S. Cl. .................... 359/618; 362/551; 362/235
(58) Field of Classification Search ............... 359/497, 359/618, 629, 638, 738, 619, 621; 362/231, 362/268, 551, 558, 356, 235–237; 385/94, 385/98–99, 38, 43, 133, 901
See application file for complete search history.

(56) References Cited

U.S. PATENT DOCUMENTS

| | | | |
|---|---|---|---|
| 4,632,513 A | 12/1986 | Stowe | |
| 4,964,692 A | 10/1990 | Prescott | |
| 5,054,874 A | 10/1991 | Hill | |
| 5,375,185 A | 12/1994 | Hermsen | |
| 5,553,183 A | 9/1996 | Bechamps | |
| 5,604,837 A | 2/1997 | Tanaka | |
| 5,610,733 A * | 3/1997 | Feldman et al. ............ | 359/9 |
| 5,701,191 A | 12/1997 | Iwasaki | |
| 5,828,505 A | 10/1998 | Farmiga | |
| 6,038,361 A | 3/2000 | Yoshikawa et al. | |
| 6,104,857 A | 8/2000 | Ishiharadsa et al. | |
| 6,149,289 A | 11/2000 | Kuramitsu et al. | |
| 6,324,330 B1 | 11/2001 | Stites | |

(Continued)

FOREIGN PATENT DOCUMENTS

JP    11-017969    1/1999

(Continued)

OTHER PUBLICATIONS

U.S. Appl. No. 10/744,922, filed Dec. 23, 2003, Cianciotto et al.

(Continued)

Primary Examiner—Scott J. Sugarman
Assistant Examiner—DaWayne A Pinkney
(74) Attorney, Agent, or Firm—MacPherson Kwok Chen & Heid LLP

(57) ABSTRACT

In accordance with an embodiment, a light mixing and homogenizing apparatus includes a tubular member and a dividing member. The tubular member has a reflective interior surface and a polygonal cross section. The tubular member has a first end configured to receive a plurality of incoming light beams and a second end configured to output mixed and homogenized light from the plurality of incoming light beams. The dividing member has a reflective surface and is located within the tubular member first end. The dividing member is configured to separate the plurality of incoming light beams from each other prior to mixing.

20 Claims, 5 Drawing Sheets

U.S. PATENT DOCUMENTS

| | | |
|---|---|---|
| 6,332,688 B1 | 12/2001 | Magarill |
| 6,366,308 B1 | 4/2002 | Hawryluk et al. |
| 6,595,673 B1 | 7/2003 | Ferrante et al. |
| 6,771,870 B2 | 8/2004 | Strobl et al. |
| 6,792,190 B2 | 9/2004 | Xin et al. |
| 6,801,701 B1 | 10/2004 | Montgomery et al. |
| 6,857,764 B2 | 2/2005 | Kohno |
| 2001/0005222 A1 | 6/2001 | Yamaguchi |
| 2004/0137089 A1 | 7/2004 | Etsuko |
| 2004/0137189 A1 | 7/2004 | Tellini et al. |
| 2005/0084210 A1 | 4/2005 | Yong-dok |
| 2005/0135766 A1* | 6/2005 | Cianciotto et al. .......... 385/133 |
| 2005/0162853 A1 | 7/2005 | Kenti |
| 2005/0237621 A1* | 10/2005 | Peterson .................... 359/618 |
| 2005/0265683 A1 | 12/2005 | Cianciotto et al. |
| 2005/0270652 A1* | 12/2005 | Voss et al. .................. 359/618 |

FOREIGN PATENT DOCUMENTS

| | | |
|---|---|---|
| JP | 11-250227 | 9/1999 |

OTHER PUBLICATIONS

U.S. Appl. No. 10/857,073, filed May 28, 2004, Cianciotto et al.

* cited by examiner

TRI-TO-HEX LIGHT MIXING AND HOMOGENIZING APPARATUS AND METHOD

TECHNICAL FIELD

The present invention relates generally to optical guides, and more particularly to an optical apparatus for mixing and homogenizing up to three input light beams having non-uniform intensity profiles and producing a single, uniform intensity output.

RELATED ART

Optical devices that mix two or more incoming light beams are known, yet such devices typically include heavy, expensive, and delicate components which limit the application of this useful technique. Further, since the incoming light beams typically have a Gaussian, non-uniform intensity distribution, additional components are typically required to produce a uniform intensity distribution. Such additional components contribute to the increased cost and weight of the optical system. Thus, there remains a need for an apparatus and method to produce a mixed and homogenized output light beam from a plurality of non-homogenous incoming light beams in a rugged, compact, and low cost manner.

SUMMARY

Apparatuses, systems, and methods are disclosed herein to provide light mixing and homogenization of a plurality of incoming light beams. For example, in accordance with an embodiment of the present invention, a light mixing and homogenizing apparatus includes a tubular member and a dividing member. The tubular member has a reflective interior surface and a polygonal cross section. The tubular member has a first end configured to receive a plurality of incoming light beams and a second end configured to output mixed and homogenized light from the plurality of incoming light beams. The dividing member has a reflective surface and is located within the tubular member first end. The dividing member is configured to separate the plurality of incoming light beams from each other prior to mixing.

According to another embodiment, a light mixing and homogenizing system includes a plurality of light sources, a tubular member, and a dividing member located within a first section of the tubular member. Each light source provides an incoming light beam having a unique wavelength. The tubular member has a reflective interior surface and a polygonal cross section. The tubular member has a first end configured to receive a plurality of incoming light beams and a second end configured to output mixed and homogenized light from the plurality of incoming light beams. The dividing member has a reflective surface and is located within the tubular member first end. The dividing member is configured to separate the plurality of incoming light beams from each other prior to mixing.

According to yet another embodiment of the present invention, a method of mixing and homogenizing a plurality of light beams includes the operations of receiving the light beams into a divided first portion of a tubular member having a reflective interior surface, homogenizing each of the incoming the light beams to produce a plurality of homogenized light beams having a substantially equal intensity distribution, mixing the homogenized light beams within an undivided second portion of the tubular member to produce a homogenized and mixed light beam, and outputting the homogenized and mixed light beam. The tubular member divided first portion includes a plurality of homogenizing chambers. Each incoming light beam has a substantially unequal intensity distribution.

The present disclosure teaches structures and methods that fulfill long felt needs in the industry by producing a mixed and homogenized light beam from a plurality of incoming light beams, where each of the incoming light beams has a non-uniform, gaussian intensity distribution. In particular, the structures and methods disclosed have particular application to diverse technology areas including optical components, entertainment, mass communications, interior/exterior aircraft lighting, and aircraft runway lighting. The disclosed structure is beneficial because it does not include a traditional, filled optical cavity or optical components such as beam splitters, and thus may be manufactured more economically. Additionally, the disclosed structure is rugged and may be used in applications that may receive physical shock. Since no additional optical components are needed, alignment issues are eliminated.

The scope of the present invention is defined by the claims, which are incorporated into this section by reference. A more complete understanding of embodiments of the present invention will be afforded to those skilled in the art, as well as a realization of additional advantages thereof, by a consideration of the following detailed description. Reference will be made to the appended sheets of drawings that will first be described briefly.

Embodiments of the present invention and their advantages are best understood by referring to the detailed

DETAILED DESCRIPTION

Figure 1:
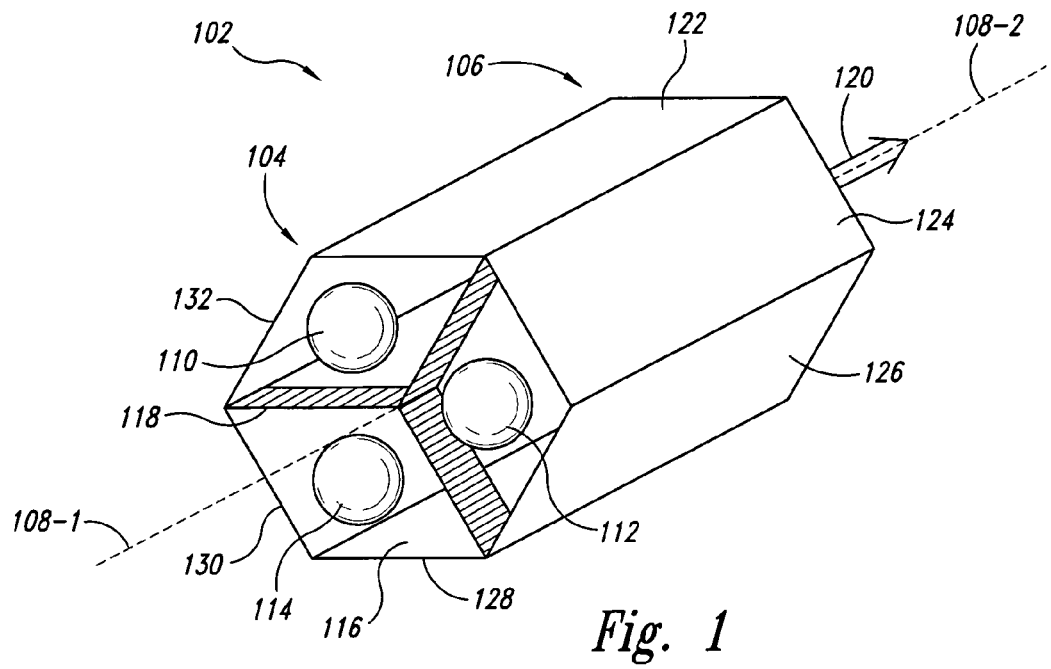
FIG. 1 shows a first perspective view of a tri-to-hex light mixing and homogenizing apparatus including a dividing member inserted along the longitudinal axis.

In reference to FIG. 1, an embodiment of a light mixing and homogenizing apparatus 100 includes a tubular member or body 102 having a hexagonal cross-section with a first end portion 104 and a second end portion 106. Both first end portion 104 and second end portion 106 are arranged about a central, longitudinal axis 108 so that the geometric cross-section for each end portion (104, 106) extends symmetrically in the direction of longitudinal axis 108 forming sides of the end portions (104, 106).

In this disclosure, longitudinal axis 108 can include a central line passing symmetrically through the long or axial direction of tubular member 102 equidistant from each side member in first end portion 104 and second end portion 106. First end portion 104 can receive a plurality of incoming light beams (110, 112, 114), each incoming light beam has a Gaussian distribution where the intensity at the center of the incoming beam is higher than near the edges. Tubular member 102 has a highly reflective interior surface 116. A dividing member 118 separates incoming light beams (110, 112, 114) prior to mixing.

The received light beams are mixed by reflection off at least one highly reflective interior surface 116 of tubular member 102 so that second end portion 106 outputs a mixed, homogenized light beam 120 having a color determined by the intensity and wavelength of each incoming light beam. Any or all of incoming light beams (110, 112, and 114) may be either coherent beams comprising a single wavelength of light, or incoherent beams comprising multiple wavelengths. In one embodiment, incoming light beams (110, 112, and 114) comprise primary colors from which other colors in a spectrum may be constructed. Primary colors visible to a human subject in this case would comprise light in the colors of red, green, and blue, where red light corresponds to a wavelength of about 630 nm to 760 nm, green light corresponds to a wavelength of about 490 nm to 570 nm, and blue light corresponds to a wavelength of about 420 nm to 490 nm.

In this disclosure, a plurality of light beams are mixed when a composite light beam is formed having wavelength components from each of the plurality light beams. Similarly, a mixed light beam is homogenized when the mixed light beam has a substantially equal intensity distribution in a direction perpendicular to the output beam path. In the present embodiment, light mixing and homogenizing apparatus 100 receives three incoming light beams (110, 112, 114) and tubular member 102 has a hexagonal cross-section having six sides (124-132) where each neighboring side joins at an edge that runs parallel to longitudinal axis 108. In this manner, light mixing and homogenizing apparatus 100 comprises a tri-to-hex light mixing and homogenizing structure.

Figure 2:
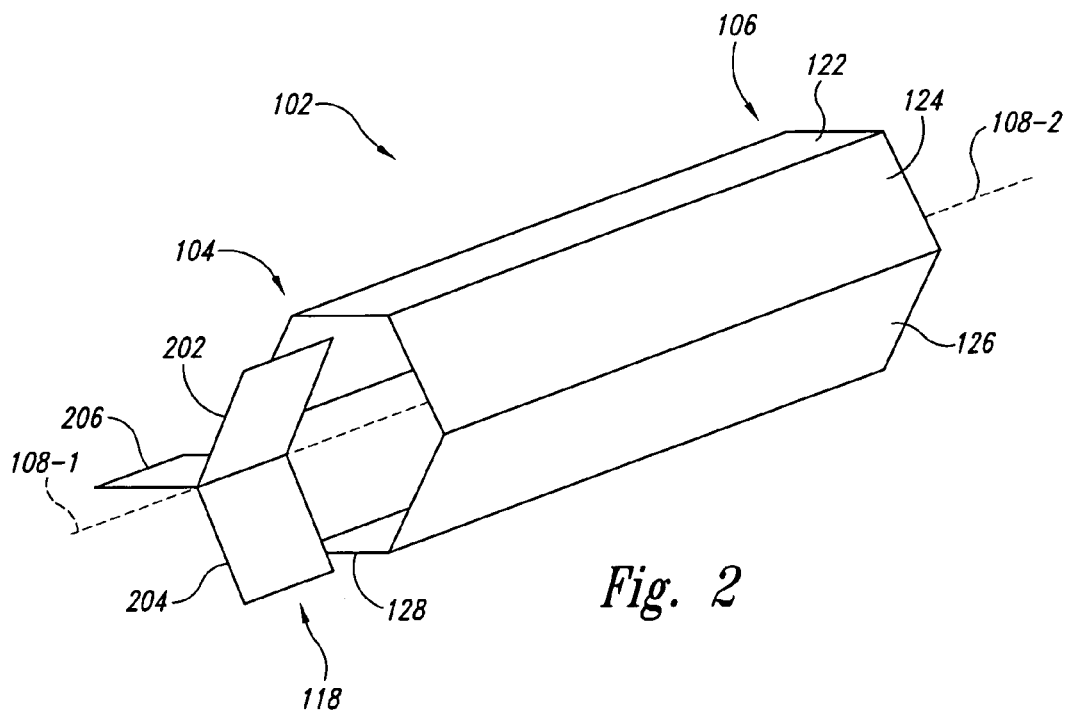
FIG. 2 shows a second perspective view of the light mixing and homogenizing apparatus with the dividing member removed.

FIG. 2 shows dividing member 118 removed from first end 104 of tubular member 102. Although a tri-to-hexagonal shape is shown in this disclosure, other geometrical cross-sections and divisions may be used for tubular member 102. Dividing member 118 includes a plurality of radii (202, 204, 206) separated from each other by a predetermined angle and each emanating from a central portion of tubular member 102 along central axis 108 so that the distal end of each radius terminates at an edge between adjacent side members.

In this embodiment, the predetermined separation angle between radii is about 120-degrees so that the radii (202-206) are symmetrically located about central axis 108. For example, dividing member 118 radius member 202 has a proximal end located near central axis 108 and a distal end located near the junction between a first planar side member 122 and a second planar side member 124. Similarly, dividing member 118 radius member 204 has a proximal end located near central axis 108 and a distal end located near the junction between a third planar side member 126 and a fourth planar side member 128.

Finally, dividing member 118 radius member 206 has a proximal end located near central axis 108 and a distal end located near the junction between a fifth planar side member 130 and a sixth planar side member 130. Other configurations are possible (not shown) including where one or more of the radii distal ends (202, 204, 206) are coincident with a center portion of a planar side member (122-132), meeting at the internal reflective surface of each side near a midpoint of the side.

In yet another alternative (not shown), the radii (202-204) are not symmetrically located about central axis 108. This has the benefit of providing for attenuation of the light source intensity in a smaller or larger homogenizing chamber in order to affect the intensity/color of output beam 120 where the intensity levels of incoming beams (110, 112, 114) are different.

Figure 3:
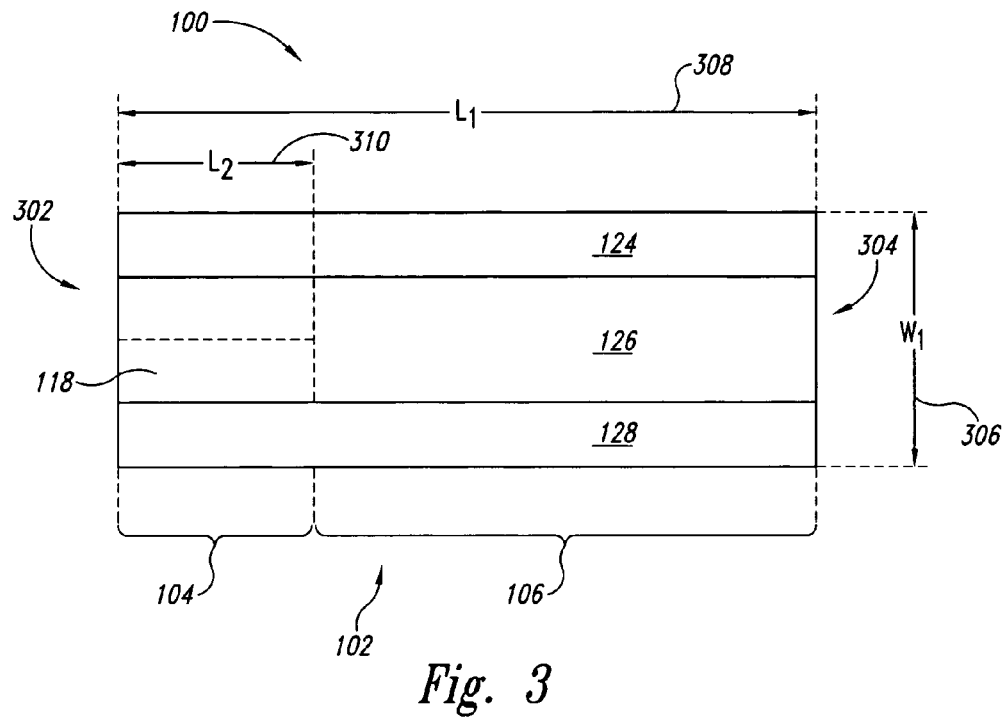
FIG. 3 shows a side view of the light mixing and homogenizing apparatus.

FIG. 3 shows a side view of light mixing and homogenizing apparatus 100 including first end portion 104 comprising a receiving end 302 and second end portion 106 comprising a transmitting end 304. The geometrical cross-section of tubular member 102 determines the number of sides, where a hexagonal cross-section has six sides. The polygonal cross-section of tubular member 102 extends in the direction of longitudinal axis 108 in order to form a hollow, substantially cylindrical structure with a diagonal opening maximum opening width $W_1$ 306 for both ends (302, 304) corresponding to a maximum diameter of tubular member 102.

The inner surfaces of first portion 104 are highly reflective in order to reflect light within tubular member 102. In one embodiment, maximum width $W_1$ 306 is 1.98 millimeters (mm), while the minimum width (not shown) measured perpendicular to opposing sides of tubular member 102 is 1.93 mm. The overall length of tubular member 102 along longitudinal axis 108 is shown as $L_1$ 308, the length of first end portion 104 is $L_2$ 310. In this manner, the ratio of the linear distance along central axis 108 of $L_2$ to $L_1$ is preferably about 3.800 mm/13.600 mm=0.2794 corresponding to a ratio of $L_1:L_2$ of about 3.6:1, and can range from about 0.2000 to about 0.3100 corresponding to a ratio of at least 5:1. The disclosed structure may be scaled for larger or smaller applications where the square area of the input 302 and output 304 are substantially equal and the corresponding ratio of $L_1:L_2$ is preserved.

Figure 4:
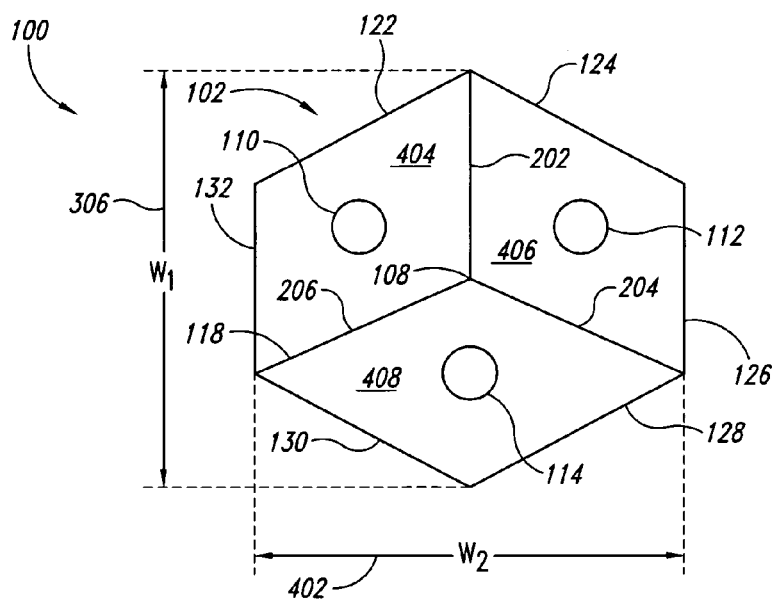
FIG. 4 shows an end view of tubular member as viewed from the first end of the tubular member.

FIG. 4 shows an end view of tubular member 102 as viewed from the first end of first end 104. Tubular member 102 has a regular, hexagonal polygon cross-section comprising six, equal-size planar side members (122-132) arranged to have a maximum opening width $W_1$ 306 and a minimum opening width $W_2$ 402. Incoming light beams (110, 112, 114) are applied in approximately the center portion of a plurality of homogenizing chambers (404, 406, 408) within which each incoming light is reflected and preliminarily homogenized prior to mixing with the other incoming light beams. Mixing and homogenizing occurs following a minimum of five reflections within tubular body 102. Since, in this embodiment the predetermined separation angle between radii is about 120-degrees so that the radii (202-206) are symmetrically located about central axis 108, tubular member 102 first end portion 104 is divided into a plurality of rhomboid-shaped homogenizing chambers having four sides where the sides are not at right angles to each other.

Figure 5:
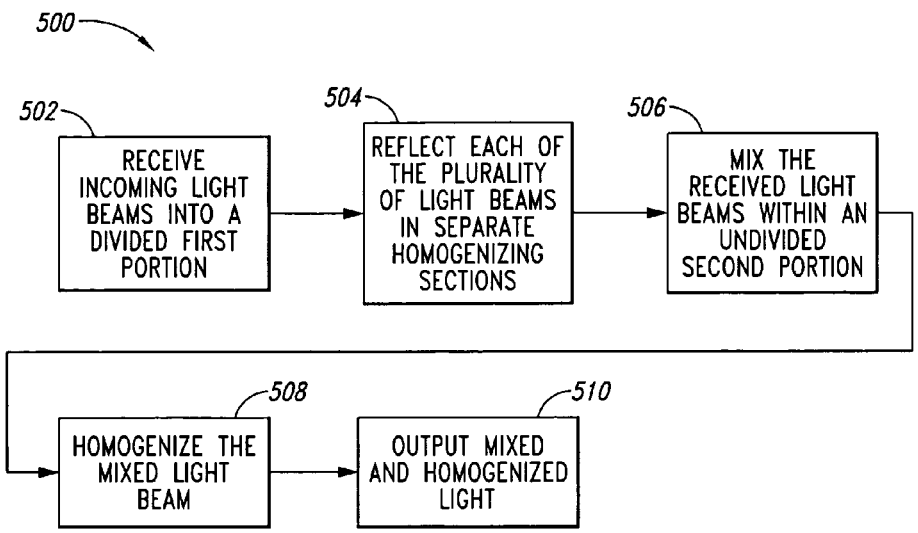
FIG. 5 shows a flow diagram indicating operations for a method of using a light mixing and homogenizing apparatus.

FIG. 5 shows a flow diagram 500 indicating operations for a method of producing mixed and homogenized light from a plurality of incoming light beams each having a different wavelength using a light mixing and homogenizing apparatus. The operations include receiving 502 a plurality of incoming light beams into divided first portion 104 of tubular member 102 as described in reference to FIG. 3. The method continues with an operation of reflecting 504 light in separate homogenizing sections to begin homogenizing the incoming light beam having a Gaussian or an unequal intensity distribution. Method 500 continues with mixing 506 the received light beams within the tubular member second portion 106. The method continues with homogenizing 508 the mixed light to produce a homogenized light beam having a substantially equal intensity or top-hat distribution. Finally, the method concludes with outputting 510 the mixed and homogenized light. In this manner, operation 504 includes an initial homogenization of a single incoming light beam within a homogenizing chamber, while operation 508 includes further homogenization the partially homogenized and mixed light beams.

Figure 6:
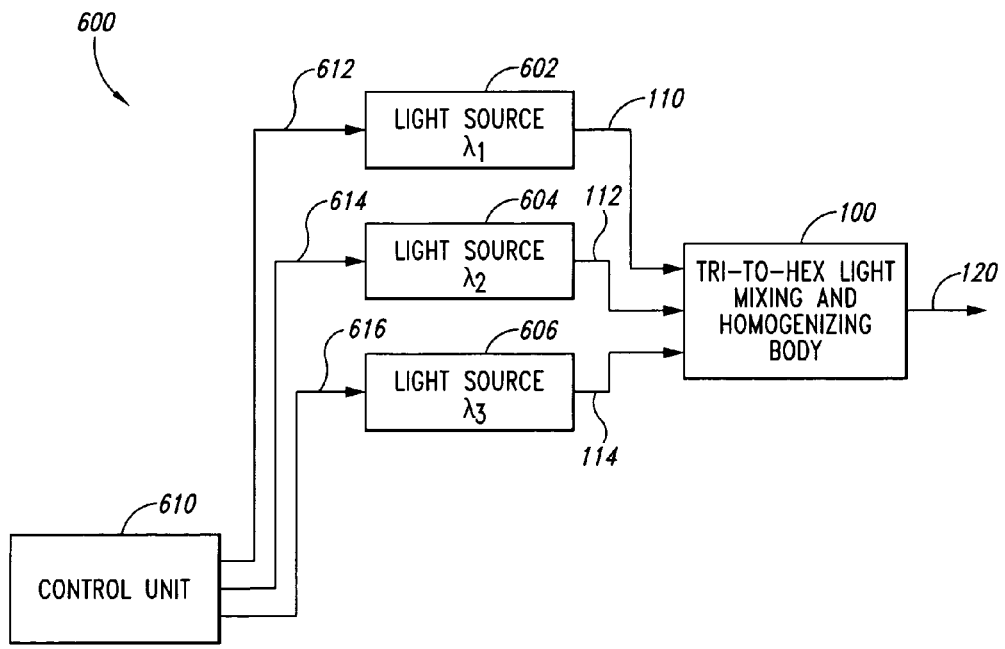
FIG. 6 shows a block diagram of a light mixing and homogenizing system that includes a plurality of light sources, a control unit, and a light mixing and homogenizing apparatus.

FIG. 6 shows a block diagram of a light mixing and homogenizing system 600 that includes a plurality of light sources (602, 604, and 606), a control unit 610, and a light mixing and homogenizing apparatus 100. Each light source outputs light of a different frequency or wavelength. For example, a first light source 602 outputs a first light beam 110 having a first wavelength $\lambda_1$. A second light source 604 outputs a second light beam 112 having a second wavelength $\lambda_2$ that is different from first wavelength $\lambda_1$. Finally, a third light source 606 outputs a third light beam 114 having a third wavelength $\lambda_3$ that is different from first wavelength, and second wavelength $\lambda_1$. Although only three light sources are shown, the number of light sources is not limited to this example. In one embodiment, $\lambda_1$ can correspond to red light within a visible range of about 630 nm to 760 nm, $\lambda_2$ can correspond to green light within a range of about 490 nm to 570 nm, and $\lambda_3$ can correspond to light within a range of about 420 nm to 490 nm.

Control unit 610 outputs a plurality of control signals (612, 614, and 616) in order to determine the intensity and wavelength of light emitted from each light source. In this manner, a continuously variable homogenized light beam 120 may be produced having a color determined by the wavelength components of the plurality of incoming light beams. For example, control unit 610 asserts a first control signal 612 to first light source 602 in order to determine the intensity and wavelength of first light beam 110 emitted from light source 802.

Similarly, control unit 610 asserts a second control signal 614 to second light source 604 in order to determine the intensity and wavelength of second light beam 112 emitted from light source 602. Finally, control unit 610 asserts a third control signal 616 to third light source 606 in order to determine the intensity and wavelength of third light beam 114 emitted from light source 606. A light beam from a light source may be conducted in an optical conduit such as an optical fiber prior to introduction within light mixing and homogenizing apparatus 100. The optical fiber may be considered as a part of the light source.

Figure 7:
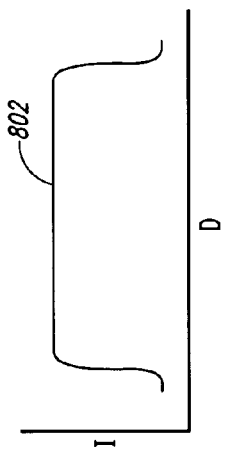
FIG. 7 shows an example of light intensity from a single optical fiber output where the light intensity profile varies across the diameter, in a direction perpendicular to the cross section of the fiber, with a typical Gaussian intensity distribution.
Figure 8:
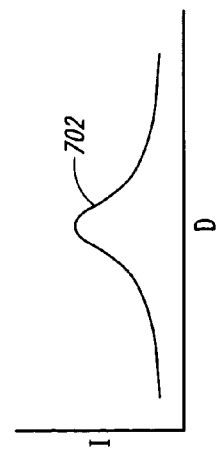
FIG. 8 shows an example of light output from the light mixing and homogenizing apparatus producing a uniform intensity across the span of the tubular member output, with a typical top-hat intensity distribution.

FIG. 7 shows an example of light intensity from a single optical fiber output, where the light intensity profile I varies across the diameter D in a direction perpendicular to the cross section of the fiber in a Gaussian distribution 702. FIG. 8 shows an example of light output from the light mixing and homogenizing apparatus producing a uniform intensity I or top-hat profile 802 across the span of the tubular member output.

Figure 9:
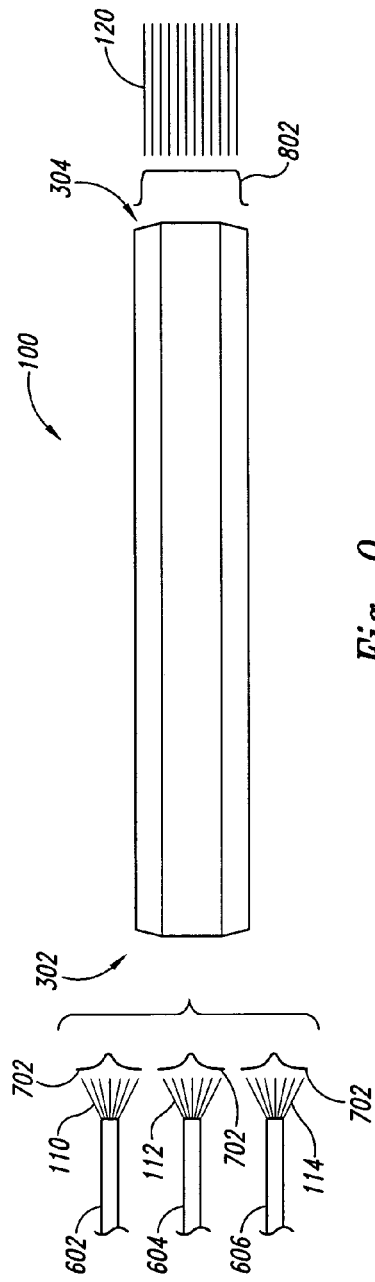
FIG. 9 shows a plurality of incoming light sources producing a plurality of incoming light beams that are applied to a receiving end of the light mixing and homogenizing apparatus.

FIG. 9 shows a plurality of incoming light sources (602, 604, and 606) producing a plurality of incoming light beams (110, 112, and 114) that are applied to receiving end 302 of light mixing and homogenizing apparatus 100. Each incoming light beam has a Gaussian profile 702. Output beam 120 has a top-hat profile 802 and is emitted from transmitting end 304 of light mixing and homogenizing apparatus 100.

Figure 10:
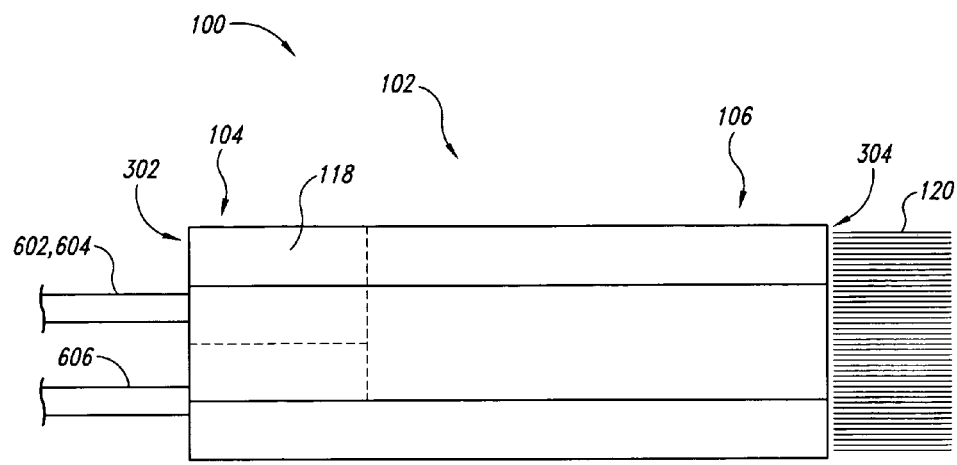
FIG. 10 shows the plurality of incoming light sources located within a receiving portion of the tubular member.

FIG. 10 shows the plurality of incoming light sources disposed within receiving end 302 of tubular member 102. A plurality of optical fibers (not shown) may be bundled together to receive the mixed and homogenized light from transmitting end 304. In this manner, the mixed and homogenized light may be applied evenly to each of the optical fibers in the bundle. Alternatively, the light from transmitting end 304 may be emitted directly into the air or another medium.

Figure 11:
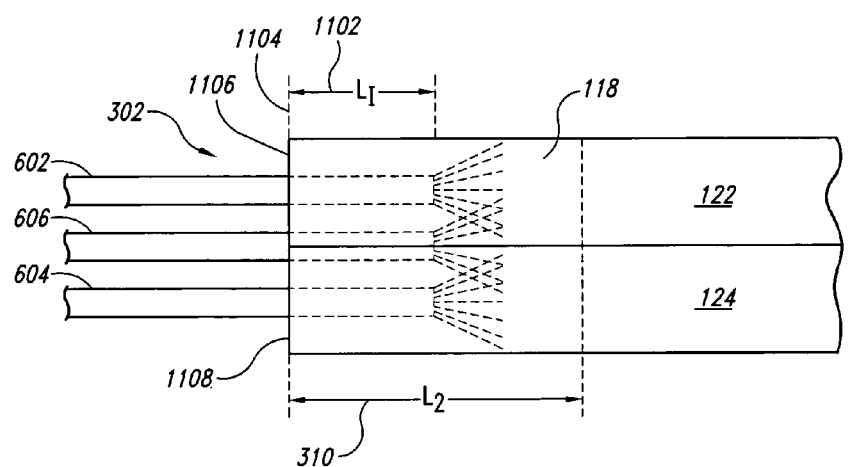
FIG. 11 shows the ends of each light source as applied to the tubular member first end portion.

FIG. 11 shows the ends of each light source (602, 604, and 606) as applied to the tubular member first end portion 104. As shown, the light sources may be inserted within first portion 104 a depth 1102 $L_I$ which allows the light beam from each light source to be introduced into the interior portion of tubular member 102 prior to mixing since the incoming light beams are separated from each other by dividing member 118. Depth 1102 preferably corresponds to from zero to about twice the diameter of the light source (602, 604, and 606). For example, a depth 1102 of zero corresponds to placing the end of light source 602 near to or crossing an insertion plane 1104 defined by an end portion 1106 of planar side member 122 and an end portion 1108 of planar side member 124. Other end portions (not shown) of the remaining planar side members (126-132) also define insertion plane 1104.

Embodiments described above illustrate but do not limit the invention. It should also be understood that numerous modifications and variations are possible in accordance with the principles of the present invention. Accordingly, the scope of the invention is defined only by the following claims.

I claim:

1. A light mixing and homogenizing apparatus, comprising:
   a tubular member having a reflective interior surface and a polygonal cross section, the tubular member having a first end and a second end, the tubular member first end being configured to receive a plurality of incoming light beams, the tubular member second end being configured to output mixed and homogenized light from the plurality of incoming light beams; and
   a dividing member having a reflective surface and disposed within the tubular member first end and configured to separate the plurality of incoming light beams from each other prior to mixing.

2. The apparatus of claim 1, wherein the dividing member forms a plurality of homogenizing chambers in the tubular member first end, each homogenizing chamber providing homogenization of an incoming light beam.

3. The apparatus of claim 1, wherein the polygonal cross section has six sides.

4. The apparatus of claim 3, wherein the six sides are of substantially equal length.

5. The apparatus of claim 1, wherein the dividing member radially separates the first tubular member first end into a plurality of regions about a central longitudinal axis.

6. The apparatus of claim 5, wherein the dividing member includes a plurality of radial members, each radial member having a first end and a second end, each radial member first end being disposed towards a center portion of the first tubular member, each radial member second end being disposed at about an edge joining adjacent tubular member sides.

7. The apparatus of claim 5, wherein the dividing member separates the first tubular member first end into three homogenizing chambers for receiving up to three incoming light beams.

8. The apparatus of claim 1, wherein the tubular member extends a predetermined first linear distance along the central axis, the dividing member extends a predetermined second linear distance along the central axis of the tubular member, and the ratio of the second linear distance to the first linear distance is between about 0.2500 to about 0.3100.

9. The apparatus of claim 8, wherein the ratio of the second linear distance to the first linear distance is about 0.2794.

10. The apparatus of claim 1, wherein the plurality of incoming light beams each have a gaussian profile.

11. The apparatus of claim 1, wherein the output light beam has a top-hat profile.

12. A light mixing and homogenizing system, comprising:
a plurality of light sources, each light source providing an incoming light beam having a unique wavelength;
a tubular member having a reflective interior surface and a polygonal cross section, the tubular member having a first end and a second end, the tubular member first end being configured to receive a plurality of incoming light beams, the tubular member second end being configured to output mixed and homogenized light from the plurality of incoming light beams; and
a dividing member having a reflective surface and disposed within the tubular member first end and configured to separate the plurality of incoming light beams from each other prior to mixing.

13. The system of claim 12, further comprising:
a control unit for determining a light intensity level for each of the plurality of light sources.

14. The system of claim 13, wherein the control unit determines a wavelength of output light for each of the plurality of light sources.

15. The system of claim 13, wherein the number of the plurality of light sources is three, the three light sources outputting light beams comprising three primary colors.

16. The system of claim 15,
wherein the three primary color light beams comprise human visible light in the colors of red, green, and blue, and
wherein red light corresponds to a range of about 630 nm to 760 nm, green light corresponds to a range of about 490 nm to 570 nm, and blue light corresponds to a range of about 420 nm to 490 nm.

17. The system of claim 12, wherein the plurality of incoming light beams each have a gaussian profile.

18. The system of claim 12, wherein the output light beam has a top-hat profile.

19. A method of mixing and homogenizing a plurality of light beams, the method comprising:
receiving the plurality of incoming light beams into a divided first portion of a tubular member having a reflective interior surface and a polygonal cross section, the tubular member divided first portion comprising a plurality of homogenizing chambers, each incoming light beam having a substantially unequal intensity distribution;
homogenizing each of the incoming light beams in a homogenizing chamber to produce a plurality of homogenized light beams having substantially equal intensity distributions;
mixing the plurality of homogenized light beams within an undivided second portion of the tubular member to produce a mixed and homogenized light beam; and
outputting the mixed and homogenized light beam.

20. The method of claim 19, wherein mixing the received light beams within an undivided second portion of the tubular member further comprises:
reflecting each of the incoming light beams from at least one interior surface of the tubular member second portion.

* * * * *